INVENTOR.
James Coulter
BY G. H. Braddock
ATTORNEY

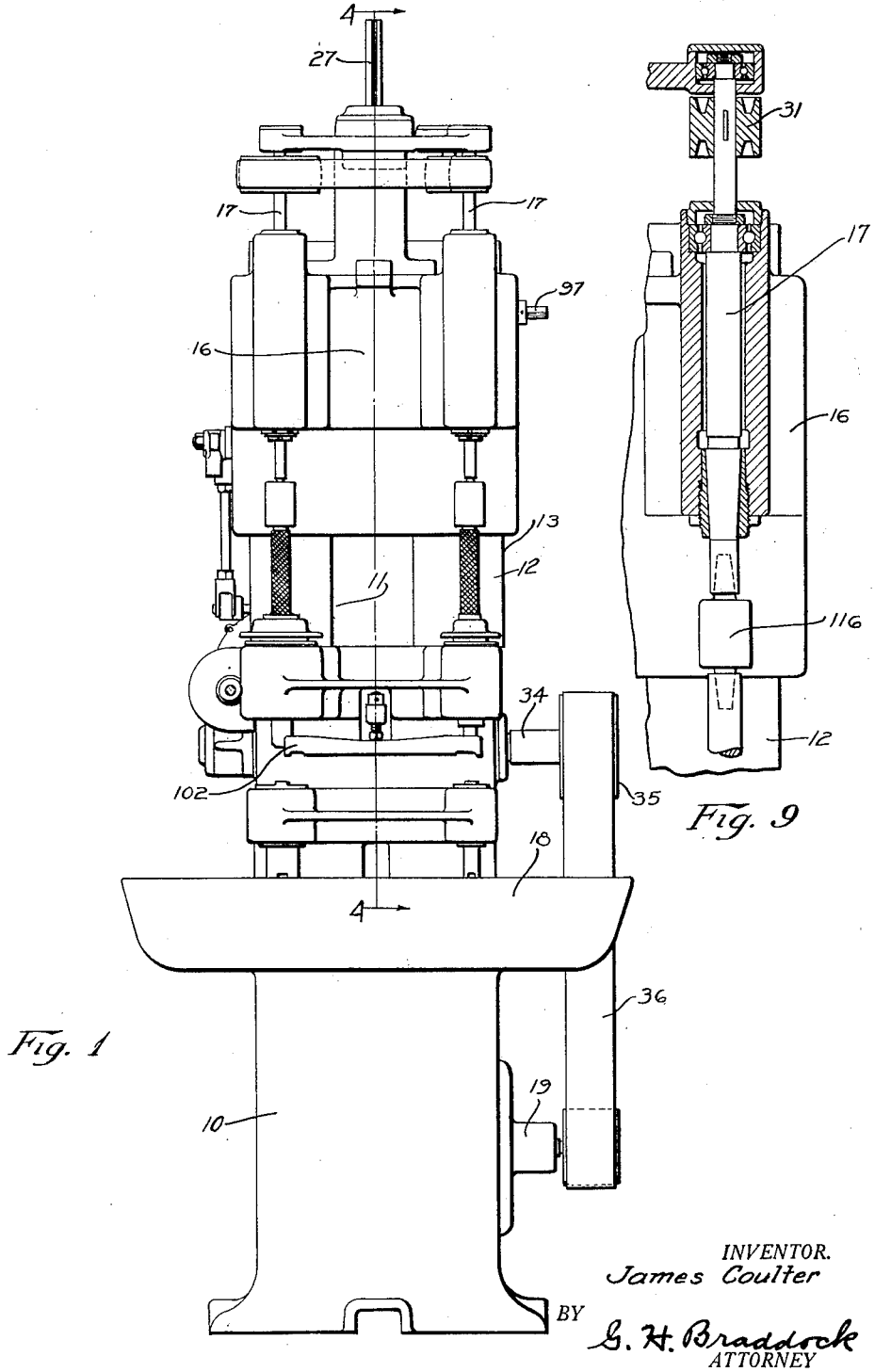

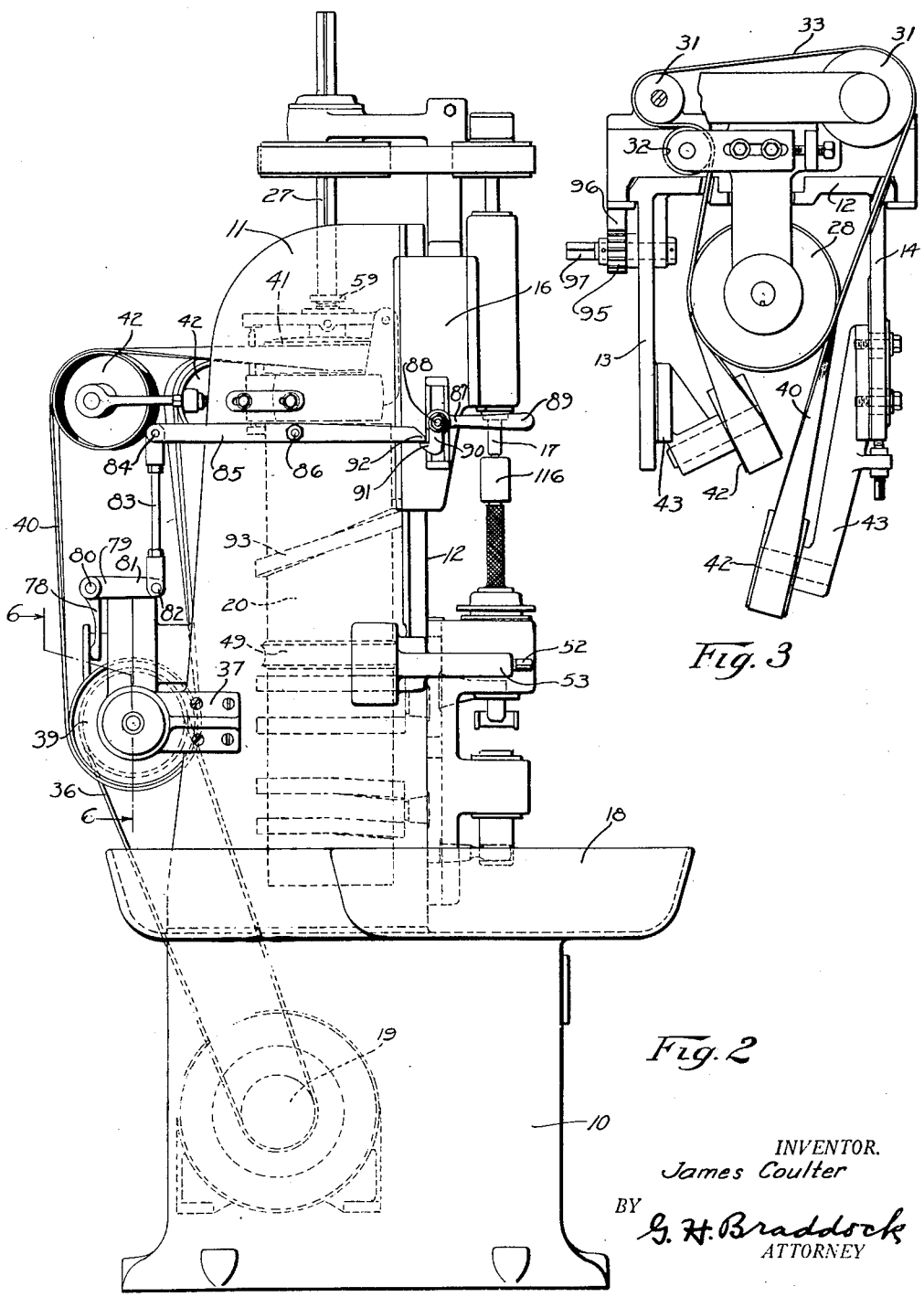

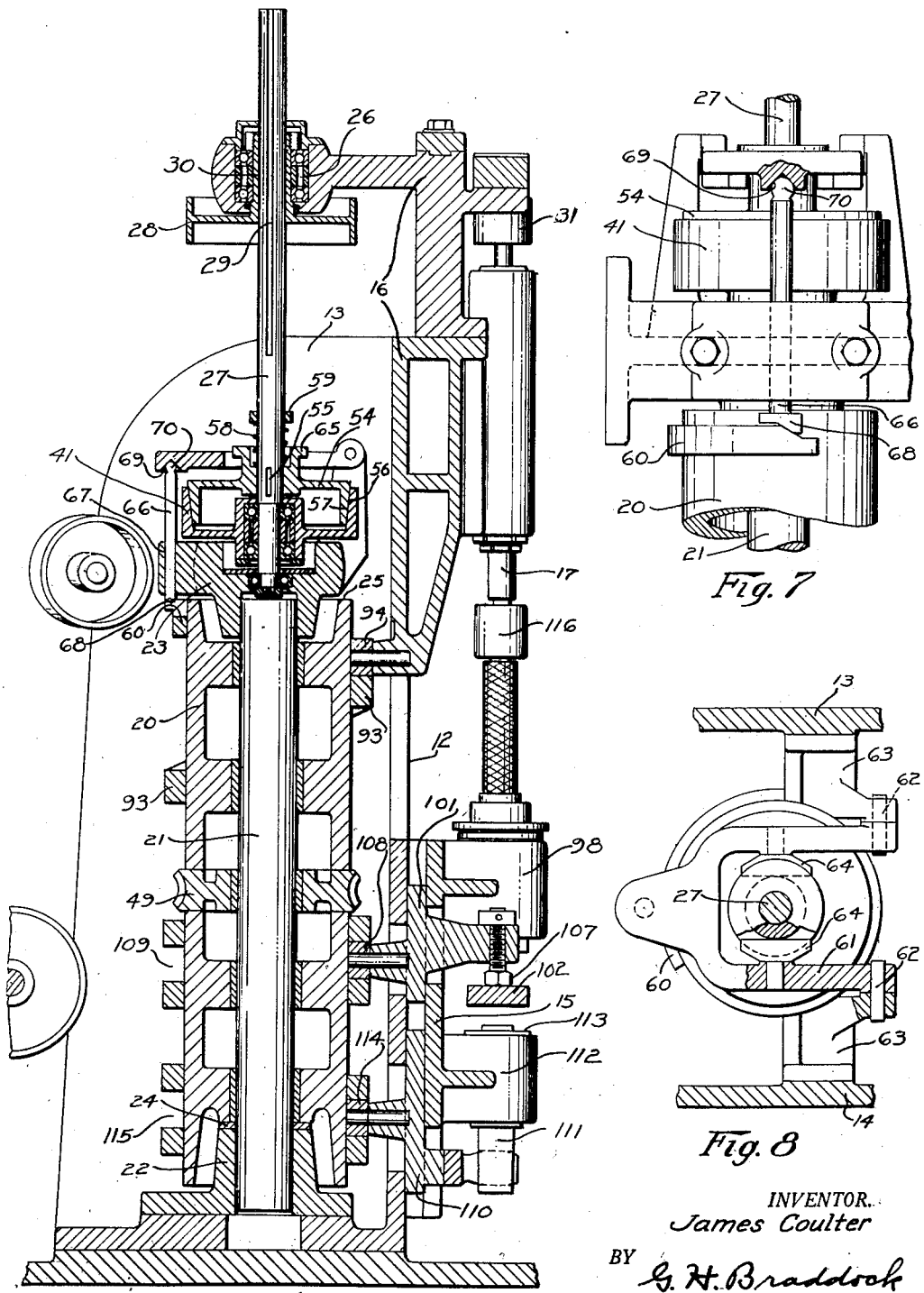

Patented June 12, 1928.

1,673,398

UNITED STATES PATENT OFFICE.

JAMES COULTER, OF BRIDGEPORT, CONNECTICUT, ASSIGNOR TO THE AUTOMATIC MACHINE COMPANY, OF BRIDGEPORT, CONNECTICUT.

BORING MACHINE.

Application filed March 2, 1927. Serial No. 172,135.

This invention relates to a machine for boring articles such as connecting rods, valve stem guides, and the like.

It is the broad object of the invention to provide a precision boring machine which will be more efficient than and an improvement generally over precision boring machines of the present character heretofore known.

A more specific object is to provide a boring machine which will include mechanism for smoothly driving the working parts of the machine, particularly the spindles including the boring bars, the driving mechanism for said spindles being frictional and including no gears, worms, or worm wheels which have a tendency to vibrate the diamonds or other boring instruments upon the boring bars.

A further specific object is to provide a precision boring machine which will be constructed to rigidly hold the work in boring position, and the parts of which will be set up to have no tendency to vary relatively to the set position of the work, whereby there will be no tendency of the work to affect the operation of the machine.

A further specific object is to provide a boring machine of the present character adapted to bore a single piece or plurality of pieces simultaneously, as, for example, both ends of one or more connecting rods, or a plurality of valve stem guides.

A further specific object is to provide in the machine a work locating device (or devices) and a work holding device (or devices) adapted to locate and hold the work in improved manner and to release it at the finish of a boring operation.

A further specific object is to provide in the machine a novel and improved means for stopping the rotation of the boring instrument (or instruments) at the finish of the boring operation and while said instrument (or instruments) is (are) withdrawing from the work.

A further specific object is to provide in the machine a novel and improved mechanism for starting the cam carrier of the machine and for bringing said cam carrier to rest at the finish of a boring operation and after the boring instrument (or instruments) has (have) been withdrawn from the work, with the parts of the machine in position to allow the removal of finished work and the insertion of new work ready to be operated upon.

And a further specific object is to provide in the machine a novel and improved construction of driving mechanism for operating all of the movable parts of the machine in synchronism.

With the above objects in view, as well as others which will become apparent as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the appended claims.

In the accompanying drawings forming a part of this specification,

Fig. 1 is a front elevational view of the machine in which the features of the invention are incorporated;

Fig. 2 is a side elevational view as seen from the left in Fig. 1;

Fig. 3 is a top plan view of a portion of the machine, parts being broken away and in section;

Fig. 4 is an enlarged sectional view taken on line 4—4 in Fig. 1;

Fig. 7 is a view detailing a part of the spindle drive friction for stopping rotation of the spindles after the boring operation and while the boring instruments are withdrawing from the work;

Fig. 8 is a further detail of said spindle drive friction;

Fig. 9 is a view detailing parts of the spindle head or slide and of a spindle.

Figure 5:
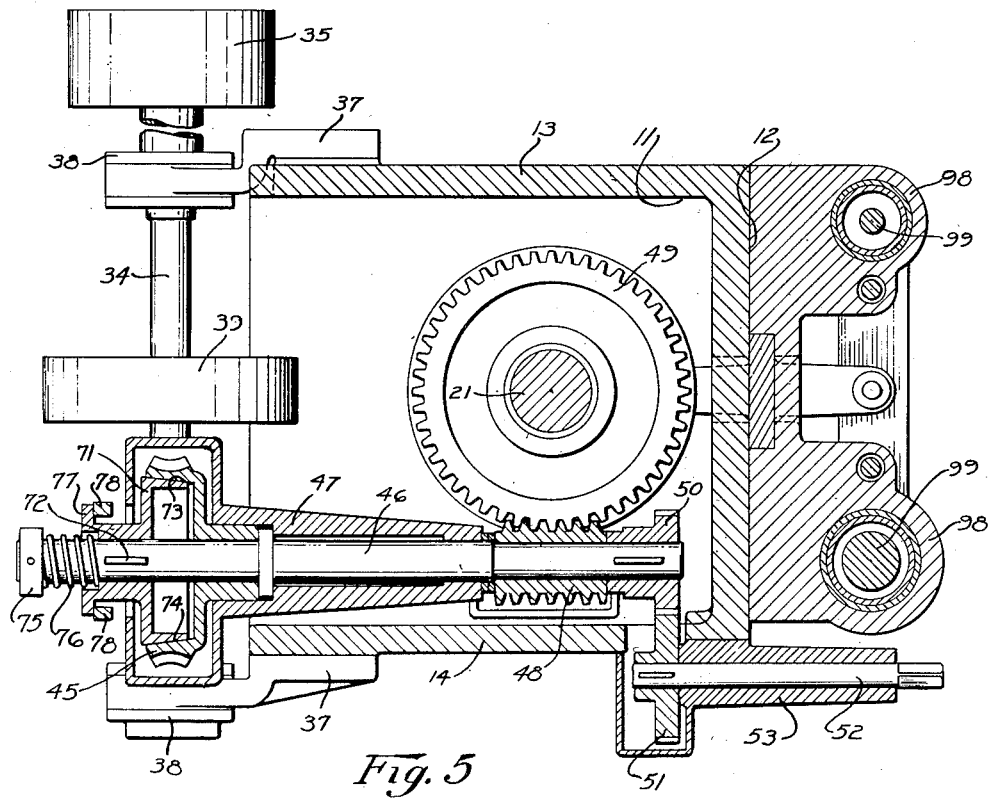
Fig. 5 is an enlarged sectional view taken on line 5—5 in Fig. 6.
Figure 6:
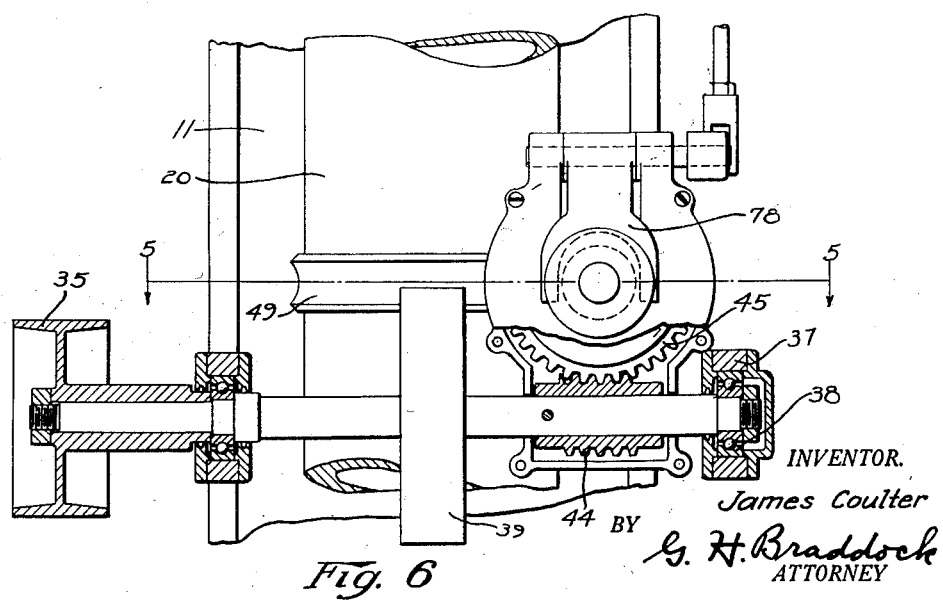
Fig. 6 is an enlarged fragmentary sectional view taken on line 6—6 in Fig. 2.

With respect to the drawings, 10 denotes the base of the machine, and 11 represents a vertical column upon said base. The column is three sided as disclosed, including a front wall 12 and side walls 13 and 14. Numeral 15, denotes a work holding fixture secured in any approved way to the front face of the lower part of the wall 12 of the column, and 16 indicates a spindle head slidably fitted to the upper part of said wall 12 in any convenient manner. Numeral 17 denotes vertical spindles suitably mounted against longitudinal movement in the spindle head 16, each spindle desirably including a self-aligning or flexible joint 116.

As shown, the base 10 has an oil pan top 18 to receive cooling lubricant to be fed to the work and boring instruments in ordinary fashion, and 19 is a motor within the base to furnish power for driving all of the machine parts.

Numeral 20 indicates a cam carrier of large diameter, which includes cams for actuating the spindle head or slide, the work locating devices, the work holding devices, and the spindle drive friction for stopping rotation of the spindles after boring and while returning to "up" position, said cam carrier being held in substantial bearings, top and bottom, and being revolved by a worm and gearing. As disclosed, the cam carrier 20 is mounted upon a vertical cam carrier shaft 21 itself mounted at its lower end in a bearing support 22 within the column 11 and resting upon the base 10 and at its upper end in a bearing support 23 suitably supported by and between the side walls 13 and 14 of said column 11. The cam carrier rests as at 24 upon the lower bearing support 22 and terminates adjacent the upper bearing support 23 as at 25.

The spindle head or slide 16 includes a bearing 26 directly above the bearing support 23. A counter shaft 27 mounted at its lower end in said bearing support 23 is mounted at its upper portion in said bearing 26. As will be more clear from Fig. 4, the bearing 26 is slidable longitudinally along the counter shaft 27. Numeral 28 denotes a pulley keyed to the counter shaft 27 as at 29, said pulley 28 also being capable of moving longitudinally upon said counter shaft, the pulley 28 and the bearing 26, in fact, moving as a unit along said counter shaft as said spindle head or slide is moved vertically, upwardly and downwardly, from and toward the work, in a manner to be made clear. As shown, a hub 30 of said pulley 28 enters the bearing 26 to fix the relation of said bearing and pulley to each other. See Fig. 4. Numeral 31 represents pulleys upon the spindles 17, 32 indicates an idler upon the spindle head or slide adjacent a pulley 31, and 33 indicates a belt upon the pulleys 28 and 31 and idler 32, whence power imparted to the counter shaft 27 is transmitted to the spindle pulleys to drive the spindles.

A main drive shaft 34 has a drive pulley 35 receiving a main shaft drive belt 36 from the motor 19 whence the main drive shaft can receive its power. The main drive shaft can be mounted upon the vertical column in any ordinary or preferred manner. As shown, brackets 37 upon the side walls 13, 14, of the column 11 have bearings 38 for said main shaft. The main drive shaft 34 also has fixed to it a driven pulley 39 receiving a counter shaft drive belt 40 which also rides over a loose pulley 41 upon the lower portion of said counter shaft just above the bearing 23, as well as over idlers 42 mounted in bearings or brackets 43 upon the side walls 13 and 14, the purpose of the idlers being to better hold the drive belt 40 in contact with the drive pulley 39 and loose pulley 41.

The main drive shaft 34 also includes a worm 44 which meshes with a worm wheel 45 loose upon a cam carrier drive shaft 46, the worm wheel 45 and drive shaft 46 being mounted in a housing 47 suitably supported upon a side wall of the vertical column 11. Numeral 48 indicates a worm fixed upon the shaft 46 and engaging a horizontal worm wheel 49 fixed to the cam carrier shaft 21 and about the cam carrier 20 at approximately its midlength. A small gear 50 keyed to the end of the cam carrier drive shaft opposite the worm wheel 45 meshes with a slightly larger gear 51 keyed to a small hand shaft 52 in a beairng 53 upon the column to make provision for hand operation of the cam carrier. See Fig. 5.

Numeral 54 indicates a friction cone fast upon the counter shaft 27 just above the loose pulley 41, said cone 54 being keyed to said counter shaft as at 55 to be slidable thereon. The cone 54 has an outer clutch face 56 adapted to normally frictionally engage an inner clutch face 57 of the pulley 41, a spring 58 upon the counter shaft and between said friction cone 54 and a collar 59 fixed to said counter shaft being adapted to hold the clutch faces 56 and 57 in snug engagement. Hence, under normal conditions, when the motor is operating, the spindles are driven, receiving their power via the main shaft drive belt 36, the main shaft 34, the counter shaft drive belt 40, the interengaged pulley 41 and cone 54 upon the counter shaft, the counter shaft, the pulley 28 at the upper portion of said counter shaft, and the spindle pulleys 31, the idler 32 being for the purpose of insuring proper engagement of the belt 33 with the spindle pulleys 31 and the pulley 28.

Mechanism is provided for causing the clutch faces 56 and 57 to become disengaged at the finish of a boring operation and to remain disengaged while the spindles are returning to "up" position; that is to say, the present mechanism is operative at the finish of a boring operation to move the clutch faces 56 and 57 apart and hold them apart during the period while the boring instruments are being withdrawn from the work, to thus allow ordinary friction to bring the spindles to rest at once so that they are not rotating when the boring instruments are being removed from the work. Of this mechanism, 60 is a cam upon the face of the carrier 20 at or adjacent the upper end of said carrier, 61 is a yoke pivoted at 62 to brackets 63 upon the side walls 13, 14 of the column 11 and having protuberances 64 resting beneath an annular shoulder 65 upon the upper part of the friction cone 54, and 66 is a vertical rod slidable as at 67 in the bearing support 23, said rod engaging the cam 60 at its lower end 68 and a depression 69 in the outer portion of the yoke at its upper rounded end 70. Clearly, the cam 60 is constructed to elevate the yoke, and hence lift the friction cone 54 against the action of the spring 58, at the finish of a boring operation and to hold said friction cone 54 lifted until the boring instruments are removed from the work, but to allow the spring 58 to return the clutch face 56 to normal position, that of engagement with the clutch face 57, before the commencement of the succeeding boring operation.

Numeral 71 indicates a friction cone fast upon the cam carrier drive shaft 46 within the housing 47 adjacent the worm wheel 45, said friction cone 71 being keyed to said cam carrier drive shaft as at 72 to be slidable thereon. The friction cone 71 has an outer clutch face 73 adapted to frictionally engage an inner clutch face 74 of the worm wheel 45. Evidently, when the clutch faces 73 and 74 are in frictional engagement and the motor is operating, the cam carrier is driven, receiving its power via the main drive belt 36, the main shaft 34, the worm 44, the intergaged worm wheel 45 and friction cone 71, the cam carrier drive shaft 46, the worm 48, and the worm wheel 49 fixed about said cam carrier. See Figs. 4 and 5. But when said clutch faces are moved apart, rotation of the cam carrier immediately ceases due to ordinary friction.

The machine has mechanism for causing the clutch faces 73 and 74 to frictionally engage each other when the cam carrier is to be set in motion, after work is set in the machine ready to be operated upon, and for moving said clutch faces apart at the finish of a boring operation and after the boring instruments have been withdrawn from the work. The present mechanism includes a device adapted to be manually actuated to allow the worm wheel 45 and friction cone 71 to engage each other at the start of the feed of the boring instruments to or toward the work and to remain in engagement during the boring operation and until the boring instruments have returned to their "up" position, with all movable parts of the machine in position to allow the removal of finished work and the insertion of new work ready to be operated upon, and adapted to be automatically actuated to move said clutch faces 73 and 74 apart as said "up" position of the boring instruments is reached. Of this mechanism, 75 is a collar upon the outer end of the cam carrier drive shaft 46, and 76 is a coil spring upon the outer end portion of said shaft 46 and between said collar and the friction cone 71, said coil spring normally urging said friction cone into clutching engagement with the worm wheel 45. Numeral 77 represents an annular shoulder upon the outer end of said friction cone 71 adapted to be engaged by a bifurcated arm 78 of an L lever 79 pivoted at 80 upon the machine. The other arm 81 of said lever 79 is pivoted at 82 to one end of a link 83 the opposite end of which link is pivoted at 84 to a lever 85 itself pivoted at 86, near its midlength, to a side wall of the column 11. Numeral 87 indicates a bell crank lever pivoted at 88, to be vertically adjustable, upon the spindle slide 16, said bell crank lever including a horizontal manipulating arm or handle 89 and a vertical arm 90 with hook or latch 91 adapted to rest beneath the forward end 92 of the lever 85. The arrangement is such that when the hook or latch 91 of the bell crank lever is beneath the end 92 of said lever 85, as in Fig. 2, said lever 85 is situated to hold the lever 79, through the instrumentality of the link 83, in position to cause the bifurcated arm 78 to hold the friction cone 71 out of clutching engagement with the worm wheel 45, said bell crank lever 87 being constructed and mounted to thus withhold the clutch face 73 from the clutch face 74 against the action of the coil spring 76. As disclosed more clearly in Fig. 2, the hook or latch 91 is beneath the forward end 92 of the lever 85 when the spindle slide 16 is in its "up" position and the machine is otherwise ready to receive work to be operated upon. Lifting the arm or handle 89 to move the hook of latch 91 from beneath the forward end 92 of the lever 85 allows the spring 76 to act to bring the clutch faces 73 and 74 into engagement to start the cam carrier, and said faces remain in engagement until the hook or latch again elevates the forward end of the lever 85 to about the position of Fig. 2. This, obviously, happens at the end of the "up" stroke of the spindle slide, the hook or latch, naturally, engaging beneath the forward end 92 as said spindle slide is elevated.

The spindle head or slide movement is controlled by a suitable cam 93 upon the cam carrier 20. As disclosed, the feed of said spindle head or slide is by gravity controlled by the cam, 94 denoting a roller upon the spindle head or slide and riding upon said cam 93. See Fig. 4. Numeral 95 indicates a small pinion mounted upon the column 11 and engaging a rack 96 upon the spindle head or slide, and 97 is a small hand shaft for actuating the pinion to elevate the roller 94 from the cam 93 should the occasion to do so be desirable or necessary.

The work holding fixture 15 includes guides 98 for the boring bars 99 having the boring instruments 100.

Figure 10:
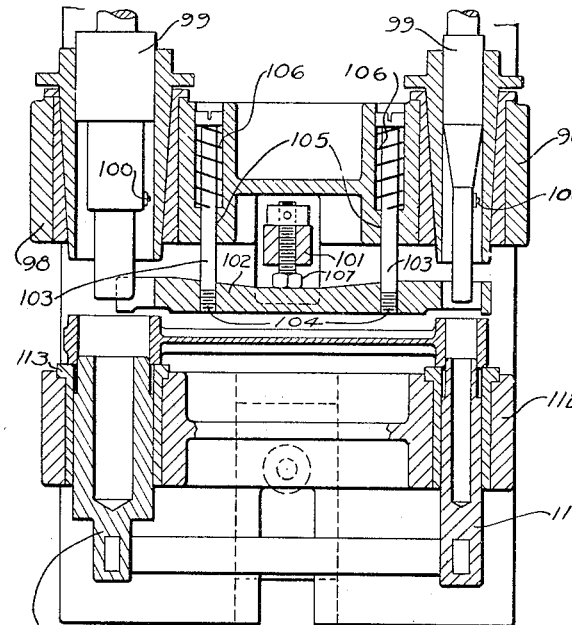
Figs. 10, 11, 12 and 13 are detail sectional views of the work and parts of the machine adjacent to the work, to better illustrate the manner in which the several parts disclosed cooperate in their operation and manipulation upon the work, as will be fully set forth hereinafter.
Figure 11:
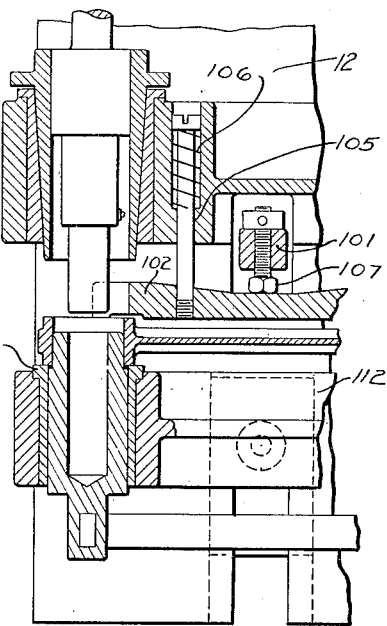
Figure 12:
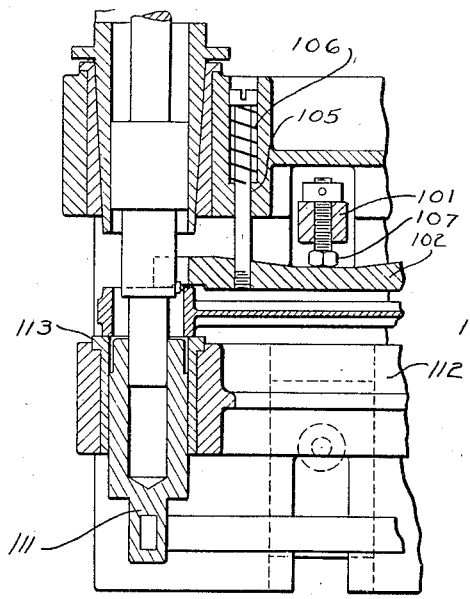
Figure 13:
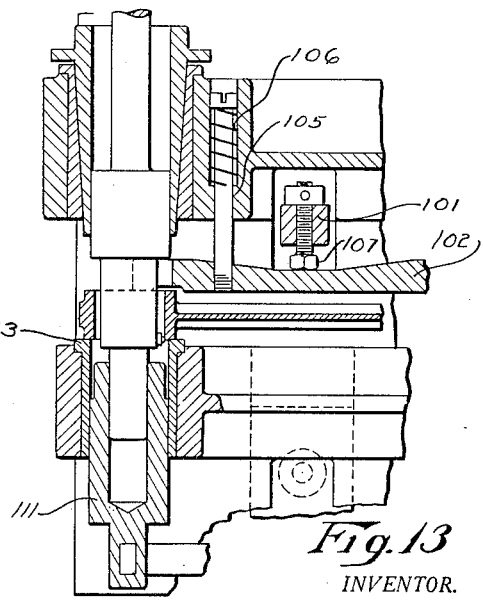

Numeral 101 represents a work holding bar operating slide vertically movable in the work holding fixture 15, and 102 indicates a work holding bar suitably and adjustably associated with said operating slide. As disclosed more clearly in Figs. 4 and 10, 103 represents screws threaded in the work holding bar at 104, said screws being longitudinally slidable in the fixture 15 as at 105, and 106 denotes coil springs in pockets of said fixture and upon said screws beneath their heads resiliently positioning the opposite end portions of said work holding bar relatively to said operating slide. 107 represents an adjustable set screw in said operating slide 101 and engaging approximately the center of said work holding bar. Numeral 108 represents a cam roller upon said operating slide 101 and ridable in a cam way 109 upon the cam carrier 20. Evidently, as the operating slide 101 moves downwardly, it carries the work holding bar 102 along against the action of the coil springs 106, and as said slide moves upwardly, the work holding bar is simultaneously lifted by the springs.

Numeral 110 denotes a locating plunger operating slide vertically movable in the fixture 15 beneath the slide 101, and 111 represents work locating plungers upon said slide 110 vertically movable in guides 112 of said fixture 15 and in a work support proper 113. Numeral 114 represents a cam roller upon said operating slide 110 and ridable in a cam way 115 upon the cam carrier 20. See Figs. 2 and 4.

The manner in which the machine operates will be very clear from the description thus far given and from the disclosure of Figs. 10 to 13.

In Figs. 1, 2, 4 and 10, the machine is at rest, ready to receive work. In Fig. 10 the work is disclosed situated upon the work support 113 and the locating plungers 111, there being two plungers 111 upon the operating slide, one fittitng the larger opening and the other the smaller opening of the connecting rod shown, which openings, respectively, are to be bored by the instruments 100 of the boring bars 99.

The machine is started in motion by elevating the arm or handle 89, thus allowing the clutch faces 73 and 74 to engage each other in the manner already fully set forth. As the cam carrier 20 rotates, the cam 60 allows the clutch faces 56 and 57 to engage, thus causing the spindles 17 to rotate. The cam ways 109 and 115 cause the work holding bar 102 and the work locating plungers 111, respectively, to move toward each other, the former holding the work down securely while the latter preferably enters the work a further distance (see Fig. 11). The cam 93 allows the spindles with boring instruments to approach the work rapidly to the starting of the boring cut and then makes a slower feed ahead of the boring instruments during the boring operation. Desirably, the locating plungers recede from the work during the boring operation (see Figs. 12 and 13). At the finish of the boring operation, the cam 60 causes the clutch faces 56 and 57 to disengage and holds said clutch faces apart while the boring instruments return to "up" position in the manner as already fully explained. When the boring instruments have lifted above the work, the cam way 109 causes the work holding bar to be elevated to release the work, and at or about this same time the cam way 115 causes the work locating plungers to again elevate a distance, so that when the boring instruments are "up", the parts are again situated as in Fig. 10. Just before the spindle slide has reached the position of Fig. 10, the hook or latch 91 has engaged the end 92 of the lever 85 to bring the machine to rest in the manner as hereinbefore fully set forth, ready for the removal of finished work and the insertion of new work. Note in Fig. 10 that the work locating the plungers 111 are elevated a slight distance above the work support proper 113 to nicely enter the lower parts of the openings of the connecting rod to be bored.

It will be evident that the present boring machine rigidly holds the work in boring position, and that there is no tendency of the work toward varying the position of the parts of the machine relatively to the work. The guides 98 and flexible joints 116 intercept thrusts upon the boring instruments which would otherwise be imparted to the driving spindles.

It will be clear that the gear reduction drive for the cam carrier 20, through the worm wheel and worm connections, can be made to advance said carrier at any desired rate of speed relatively to the boring speed of the spindles having the boring instruments 100.

While I have preferred to disclose a work holding bar adapted to engage both end portions of the connecting rod shown, it will be apparent that separate work holding devices, one for each end portion of the work, could be employed. Obviously, the type of work holder utilized in any case would suit the work being bored.

Many alterations in the construction, and many apparently widely differing embodiments and applications of the invention will suggest themselves to those skilled in the art of making boring machines, without departing from the scope and spirit thereof. For instance, this same machine can be employed for boring valve stem guides, or for boring other work. For valve stem guides a four spindle head could be utilized, including two inner spindles driven with one belt and two outer spindles driven with a different belt, one above the other to a wide pulley for driving, thus allowing better belt contact and large pulleys. The working table or fixture onto which the work is placed could include dowels for locating the work and upper and lower boring bar guides for each hole.

Having thus fully described the invention, what I claim as new and desire to secure by Letters Patent is:

1. In a boring machine, a main shaft, a cam carrrier, a spindle having a boring instrument, driving connection between said main shaft and said spindle for rotating said spindle, a driving connection between said main shaft and said cam carrier for rotating said cam carrier, a cam associated with the spindle and carrier for reciprocating the spindle, a work holder, a cam associated with the work holder and carrier for actuating said work holder, and a cam upon said carrier for holding the driving connection between said main shaft and said spindle broken during the non-work stroke of said boring instrument.

2. In a boring machine, a main shaft, a cam carrier, a spindle having a boring instrument, a driving connection between said main shaft and said spindle for rotating said spindle, a driving connection between said main shaft and said cam carrier for rotating said cam carrier, a cam associated with the spindle and carrier for reciprocating the spindle, a work holder, a cam associated with the work holder and carrier for actuating said work holder, a cam upon said carrier for holding the driving connection between said main shaft and said spindle broken during the non-work stroke of said boring instrument, and a device for breaking the driving connection between said main shaft and cam carrier when said boring instrument has reached it farthest distance from said work.

3. In a boring machine, a main shaft, a cam carrier, a spindle having a boring instrument, a driving connection between said main shaft and said spindle for rotating said spindle, a reduction driving connection between said main shaft and said cam carrier for rotating said cam carrier, a cam associated with the spindle and carrier for reciprocating the spindle, a work holder, a cam associated with the work holder and carrier for actuating said work holder, a cam upon said carrier for holding the driving connection between said main shaft and said spindle broken during the non-work stroke of said boring instrument, a device for breaking the reduction driving connection between said main shaft and said cam carrier when said boring instrument has reached its farthest distance from said work, and means movable with said spindle for actuating said device.

4. In a boring machine, a main shaft, a cam carrier, a spindle having a boring instrument, a frictional driving connection between said main shaft and said spindle for rotating said spindle, a worm and gear reduction driving connection between said main shaft and said cam carrier for rotating said cam carrier, a cam associated with the spindle and carrier for reciprocating said spindle, a work holder, a cam associated with the work holder and carrier for actuating said work holder, a cam upon said carrier for holding the driving connection between said main shaft and said spindle broken during the non-work stroke of said boring instrument, and a device for breaking the reduction driving connection between said main shaft and cam carrier when said boring instrument has reached its farthest distance from said work whereby the spindle with boring instrument comes to complete rest at the limit of the movement of the boring instrument from the work.

5. In a boring machine, a main shaft, a cam carrier, a spindle having a boring instrument, a frictional driving connection between said main shaft and said spindle for rotating said spindle, a worm and gear reduction driving connection between said main shaft and said cam carrier for rotating said cam carrier, a cam associated with the spindle and carrier for reciprocating said spindle, a work holder, a cam associated with the work holder and carrier for actuating said work holder, a cam upon said carrier for holding the driving connection between said main shaft and said spindle broken during the non-work stroke of said boring instrument, a device for breaking the reduction driving connection between said main shaft and cam carrier when said boring instrument has reached its farthest distance from said work, and means movable with said spindle for actuating said device.

6. In a boring machine, a main shaft, a cam carrier, a spindle having a boring instrument, a driving connection between said main shaft and said spindle for rotating said spindle, a driving connection between said main shaft and said cam carrier for rotating said cam carrier, a cam associated with the spindle and carrier for reciprocating the spindle, a work holder, a cam associated with the work holder and carrier for actuating said work holder, a work locating device, a cam associated with the locating device and carrier for actuating said locating device, and a cam upon said carrier for holding the driving connection between said main shaft and said spindle broken during the non-work stroke of said boring instrument.

7. In a boring machine, a main shaft, a cam carrier, a spindle having a boring instrument, means for reciprocating said spindle, a driving connection between said main shaft and said spindle for rotating said spindle, a driving connection between said main shaft and said cam carrier for rotating said cam carrier, a cam associated with the work holder and carrier for actuating said work holder, a work locating device, a cam associated with the locating device and carrier for actuating said locating device, a cam upon said carrier for holding said driving connection between said main shaft and said spindle broken during the non-work stroke of said boring instrument, and a device for breaking the driving connection between said main shaft and said cam carrier.

8. In a boring machine, a main shaft, a cam carrier, a spindle having a boring instrument, a frictional driving connection between said main shaft and said spindle for rotating said spindle, a worm and gear reduction driving connection between said main shaft and said cam carrier for rotating said cam carrier, a work holder, a work locating device, cams associated with said carrier to reciprocate said spindle, said work holder and said work locating device, a cam upon the carrier for holding the frictional driving connection between said main shaft and said spindle broken during the non-work stroke of said boring instrument, and a device for breaking the reduction driving connection between said main shaft and cam carrier when said boring instrument has reached its farthest distance from said work.

9. In a boring machine, a main shaft, a spindle having a boring instrument, a frictional driving connection between said main shaft and said spindle for rotating said spindle, spindle reciprocating means, a reduction connection between said main shaft and said means, a work holder, a work locating device, mechanism for holding said frictional driving connection between said main shaft and said spindle broken during the non-work stroke of said boring instrument, means actuatable through said reduction connection for actuating said work holder and locating device, and a device for breaking said reduction connection between said main shaft and said means when said boring instrument has reached the limit of its non-work stroke and said work holder and locating device are positioned for the removal of a piece of work and the insertion of a different piece.

10. In a boring machine, a main shaft, a spindle having a boring instrument, a driving connection between said main shaft and said spindle for rotating said spindle, spindle reciprocating means, a reduction connection between said main shaft and said means, a work holder, a work locating device, means actuatable through said reduction connection for actuating said work holder and locating device, a device for breaking said reduction connection between said main shaft and said means when said boring instrument has reached the limit of its non-work stroke and said work holder and locating devices are positioned for the removal of a piece of work and the insertion of a different piece, and means movable with said spindle for actuating said last mentioned device.

11. In a boring machine, a main shaft, a spindle to be driven, a cam carrier, a cam thereon for reciprocating said spindle, means for rotating said cam carrier, a counter shaft, a driving connection between said counter shaft and said spindle, a pulley loose upon said counter shaft, a driving connection between said main shaft and said pulley, a friction cone slidably fixed upon said counter shaft, a spring upon said counter shaft urging said cone into clutching engagement with said pulley, and a cam upon said carrier for moving said cone away from said pulley against the action of said spring.

12. In a boring machine, a main shaft, a spindle to be rotated and reciprocated, means for rotating said spindle from said main shaft, means for reciprocating said spindle from said main shaft including a second shaft having a loose rotatable member, a friction cone slidably fixed upon said second shaft, and a spring urging said friction cone into clutching engagement with said member, and means for moving said cone and member apart and for allowing them to engage each other, said last mentioned means comprising lever connections engaging said friction cone and a machine starting and stopping device associated with said spindle and adapted to control said lever connections.

13. The combination as specified in claim 12, wherein said device is adapted to be manually manipulated to release said levers to allow said spring to operate to cause said member and cone to engage each other, and to be automatically manipulated to actuate said lever connections to overcome the action of said spring and move said member and cone apart.

Signed at Bridgeport in the county of Fairfield and State of Connecticut this 28th day of February, A. D., 1927.

JAMES COULTER.